(12) United States Patent
Iihoshi

(10) Patent No.: US 9,794,962 B2
(45) Date of Patent: Oct. 17, 2017

(54) COMMUNICATING SYSTEM, COMMUNICATING TERMINAL, COMMUNICATING METHOD AND STORAGE MEDIUM

(71) Applicant: Takahiro Iihoshi, Tokyo (JP)

(72) Inventor: Takahiro Iihoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 109 days.

(21) Appl. No.: 14/387,228

(22) PCT Filed: Mar. 21, 2013

(86) PCT No.: PCT/JP2013/001906
§ 371 (c)(1),
(2) Date: Sep. 22, 2014

(87) PCT Pub. No.: WO2013/140801
PCT Pub. Date: Sep. 26, 2013

(65) Prior Publication Data
US 2015/0009935 A1 Jan. 8, 2015

(30) Foreign Application Priority Data
Mar. 23, 2012 (JP) .................................. 2012-068189

(51) Int. Cl.
*H04W 4/00* (2009.01)
*H04W 76/02* (2009.01)
(Continued)

(52) U.S. Cl.
CPC ........... *H04W 76/02* (2013.01); *H04L 67/125* (2013.01); *H04L 67/141* (2013.01); *H04L 67/28* (2013.01); *H04W 12/06* (2013.01)

(58) Field of Classification Search
CPC . H04W 76/02; H04W 76/025; H04W 76/026; H04W 12/06; H04L 67/14;
(Continued)

(56) References Cited

U.S. PATENT DOCUMENTS

| 4,477,809 A | * | 10/1984 | Bose | ...................... H04W 74/02 340/10.41 |
| 4,937,818 A | * | 6/1990 | Sonetaka | ............. H04B 7/2643 370/348 |

(Continued)

FOREIGN PATENT DOCUMENTS

| JP | 2002-073565 | 3/2002 |
| JP | 2003-198568 | 7/2003 |

(Continued)

OTHER PUBLICATIONS

Extended European Search Report issued by the European Patent Office for Application No. 13765141.0 dated Oct. 22, 2015 (7 pages).

(Continued)

*Primary Examiner* — Kevin Mew
(74) *Attorney, Agent, or Firm* — Wilmer Cutler Pickering Hale and Dorr LLP

(57) ABSTRACT a network service using apparatus automatically performs a communication setting of a communicating terminal, when the network service using apparatus connects a network through the communicating terminal. A communicating terminal of the present invention contains a first communicating unit, a second communicating unit, a third communicating unit and a communication setting unit. The first communicating unit communicates with a network service providing apparatus through a network. The second communicating unit communicates with a network service using apparatus. The third communicating unit receives a request message of a communication path establishment, from the
(Continued)

network service using apparatus. The communication setting unit performs the communication settings of the first communicating unit and the second communicating unit to establish a communication path through the first communicating unit and the second communicating unit based on the request message from the third communicating unit.

10 Claims, 12 Drawing Sheets

(51) Int. Cl.
H04L 29/08 (2006.01)
H04W 12/06 (2009.01)

(58) Field of Classification Search
CPC ..... H04L 67/141; H04L 67/147; H04L 67/16; H04L 67/125; H04L 67/28
See application file for complete search history.

(56) References Cited

U.S. PATENT DOCUMENTS

| | | | | |
|---|---|---|---|---|
| 5,732,078 | A * | 3/1998 | Arango | H04L 12/5692 370/355 |
| 5,848,138 | A * | 12/1998 | Sarpola | H04M 15/00 379/114.01 |
| 5,987,126 | A * | 11/1999 | Okuyama | G11B 20/00086 375/E7.022 |
| 6,108,314 | A * | 8/2000 | Jones | H04L 5/1469 370/294 |
| 6,751,677 | B1 | 6/2004 | Ilnicki et al. | |
| 7,289,479 | B2 * | 10/2007 | Fukuda | H04L 12/2859 370/328 |
| 7,319,687 | B2 * | 1/2008 | Tsutsumi | H04L 12/5695 370/338 |
| 8,116,735 | B2 * | 2/2012 | Liu | H04L 63/0853 370/328 |
| 2001/0036175 | A1 * | 11/2001 | Hurtta | H04W 12/12 370/352 |
| 2004/0010596 | A1 * | 1/2004 | Hui | H04L 67/14 709/228 |
| 2004/0013247 | A1 * | 1/2004 | Kurokawa | H04M 1/57 379/88.17 |
| 2004/0023641 | A1 * | 2/2004 | Tsutsumi | H04M 1/72519 455/411 |
| 2004/0037260 | A1 * | 2/2004 | Kakemizu | H04L 12/4641 370/338 |
| 2004/0100945 | A1 * | 5/2004 | Morita | H04L 63/1408 370/360 |
| 2004/0252715 | A1 | 12/2004 | Noda et al. | |
| 2005/0048953 | A1 * | 3/2005 | Ohara | H04L 12/2697 455/412.1 |
| 2005/0207378 | A1 * | 9/2005 | Zaitsu | G06Q 30/0603 370/338 |
| 2006/0025146 | A1 * | 2/2006 | Gallagher | H04W 60/04 455/446 |
| 2006/0068785 | A1 * | 3/2006 | Kamijo | H04L 63/0272 455/435.1 |
| 2006/0068801 | A1 * | 3/2006 | Usuda | G01S 11/06 455/450 |
| 2006/0087999 | A1 * | 4/2006 | Gustave | H04L 63/0853 370/328 |
| 2006/0172769 | A1 * | 8/2006 | Oh | H04W 36/30 455/557 |
| 2006/0174037 | A1 * | 8/2006 | Bernardi | H04L 29/12207 709/245 |
| 2007/0071226 | A1 * | 3/2007 | Neuhaus | H04L 29/06 379/355.02 |
| 2007/0287501 | A1 * | 12/2007 | Hoshina | H04W 16/02 455/562.1 |
| 2008/0192709 | A1 * | 8/2008 | Mikami | H04L 12/2854 370/338 |
| 2009/0253417 | A1 * | 10/2009 | Soma | G06Q 30/02 455/414.2 |
| 2009/0280849 | A1 * | 11/2009 | Rosen | H04L 47/805 455/518 |
| 2011/0019641 | A1 * | 1/2011 | Chang | H04W 36/005 370/331 |
| 2011/0040862 | A1 * | 2/2011 | Nakajima | H04L 12/2836 709/223 |
| 2011/0206013 | A1 * | 8/2011 | Aramoto | H04W 36/26 370/332 |
| 2012/0066134 | A1 | 3/2012 | Washiro | |
| 2012/0084516 | A1 * | 4/2012 | Iwuchukwu | H04L 67/2847 711/144 |
| 2012/0208506 | A1 * | 8/2012 | Hirano | H04L 63/08 455/411 |
| 2012/0222101 | A1 * | 8/2012 | Iwasaki | H04L 63/0823 726/7 |
| 2012/0252412 | A1 * | 10/2012 | Kimura | H04L 63/08 455/411 |
| 2013/0268705 | A1 * | 10/2013 | Maji | G06F 13/4291 710/110 |
| 2015/0046830 | A1 * | 2/2015 | Formo | H04W 4/008 715/740 |
| 2017/0033829 | A1 * | 2/2017 | HomChaudhuri | H04B 1/401 |

FOREIGN PATENT DOCUMENTS

JP 2011-229184 11/2011
JP 2012-060373 3/2012

OTHER PUBLICATIONS

International Preliminary Report on Patentability issued by The International Bureau of WIPO for International Application No. PCT/JP2013/001906 mailed on Oct. 2, 2014 (5 pages).
International Preliminary Report on Patentability corresponding to PCT/JP2013/001906, dated Oct. 2, 2014, 5 pages.
International Search Report corresponding to PCT/JP2013/001906, mail date May 14, 2013, 2 pages.
NEC Casio Mobile Communications, "Medias WP Using Guide WiFi / Mobile Network", [online], <URL: http://www.n-keitai.com/n-06c/guide/step 15-03.html>, 1 page.

* cited by examiner

[Fig. 1]
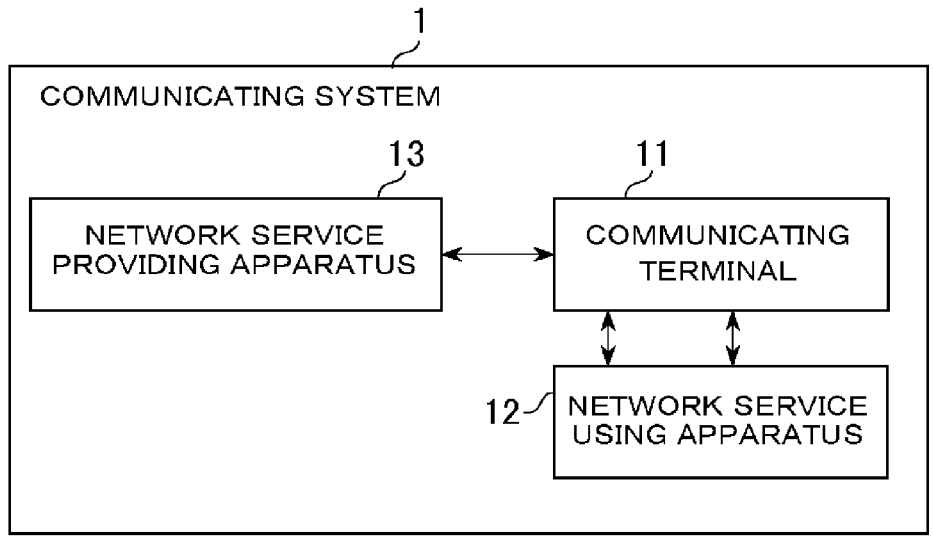
[Fig. 2]
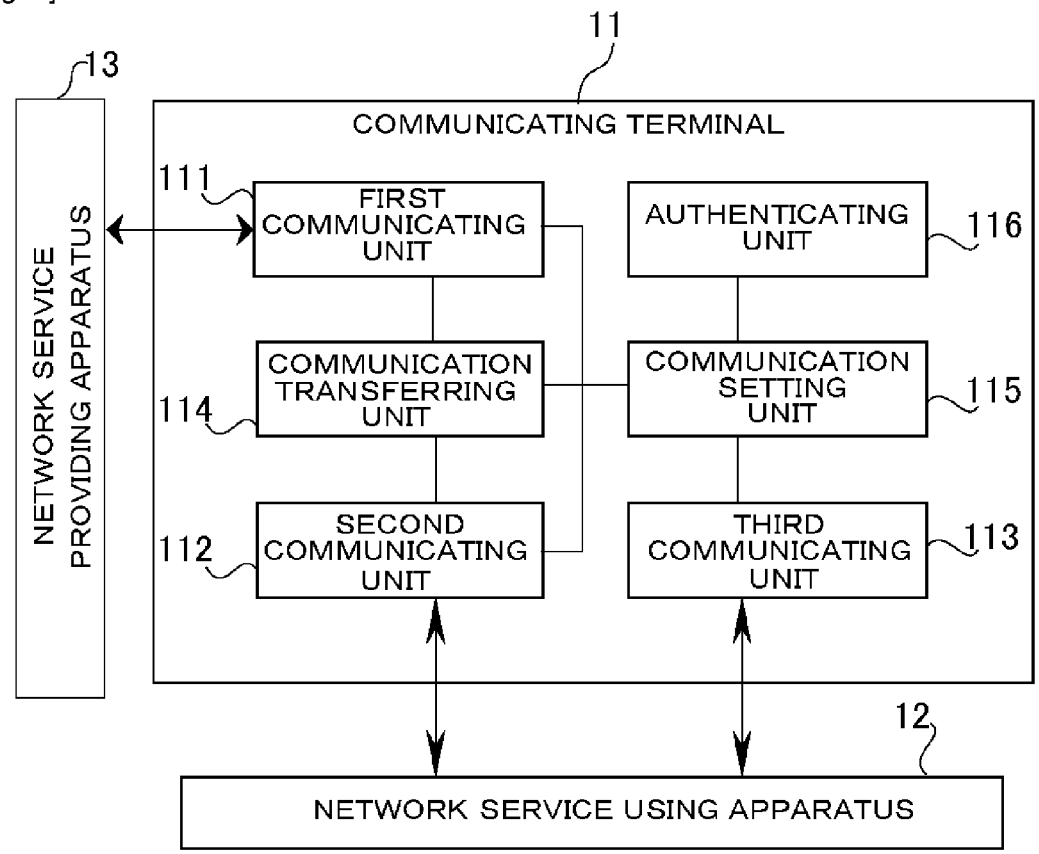

[Fig. 3]
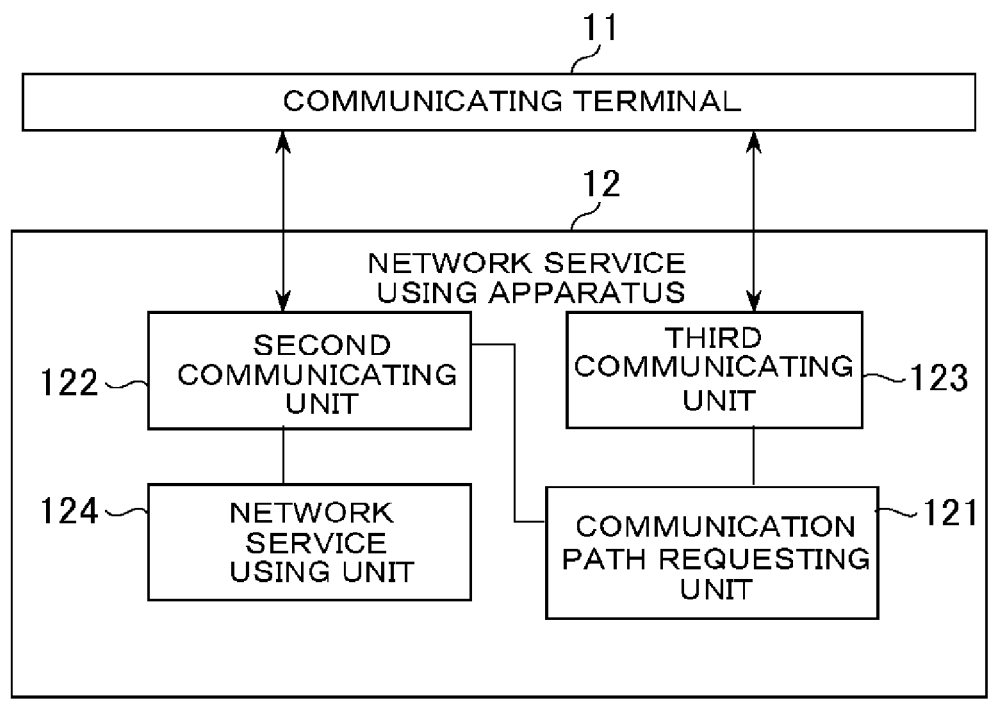
[Fig. 4]
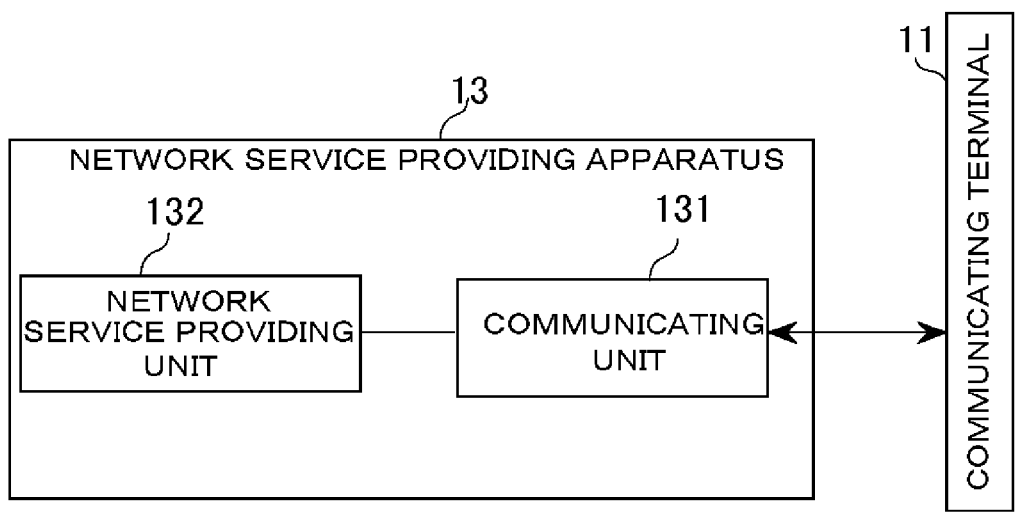

[Fig. 5]
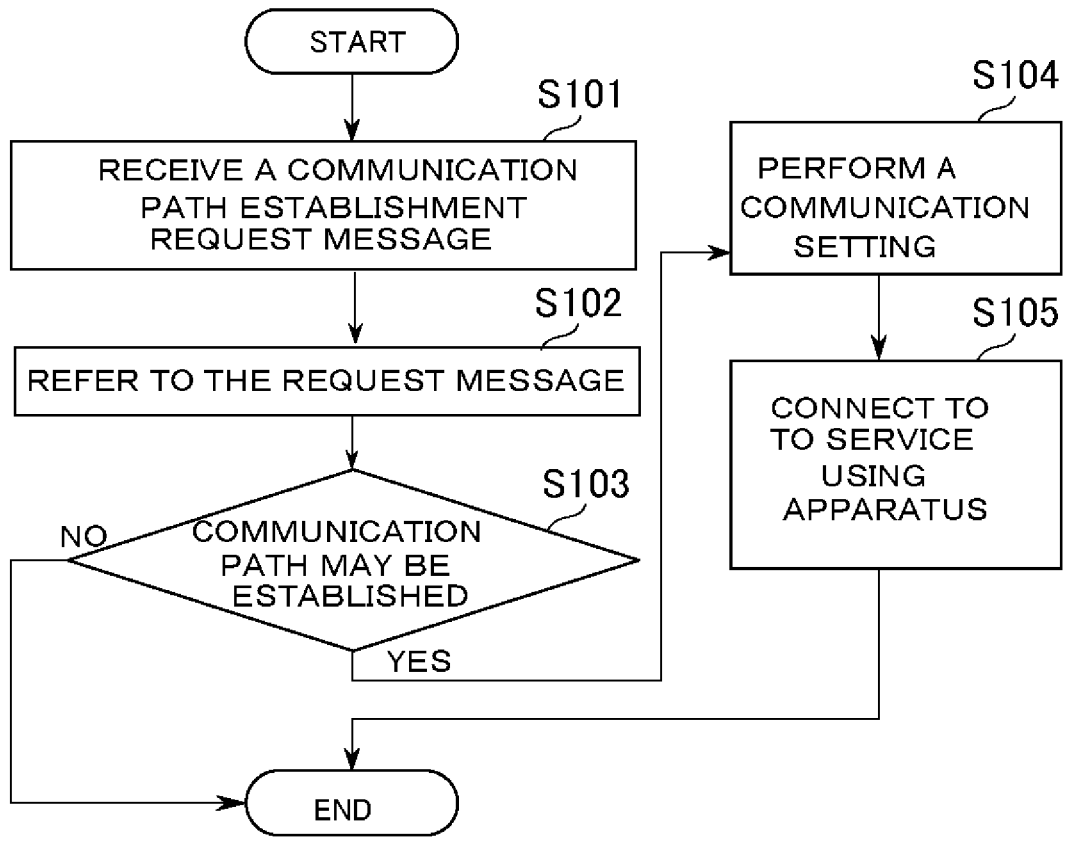
[Fig. 6]
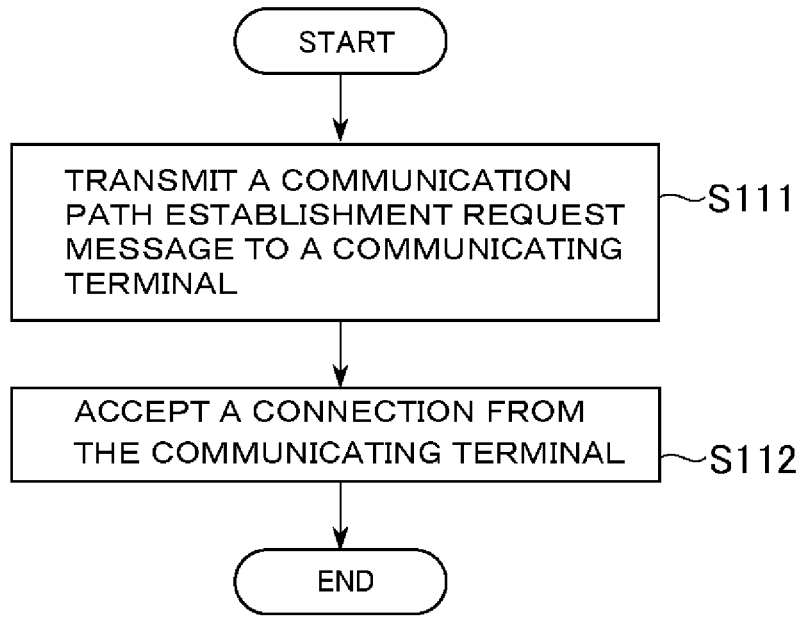

[Fig. 7]
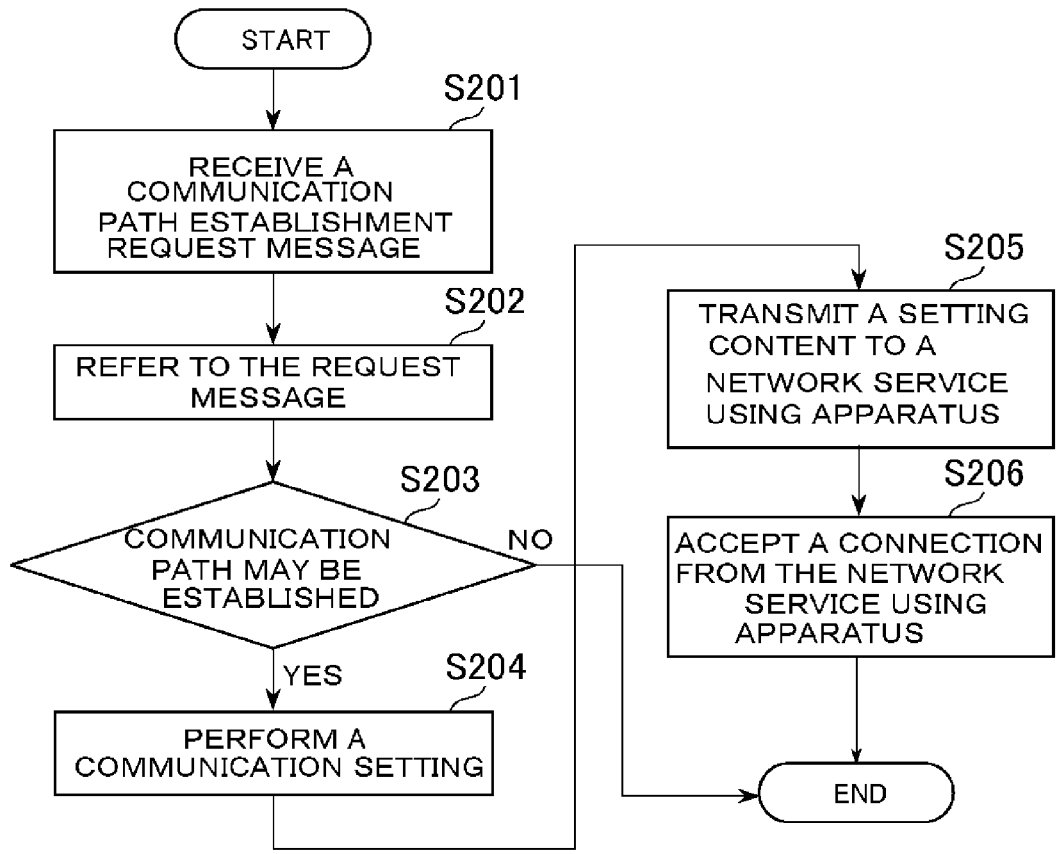
[Fig. 8]
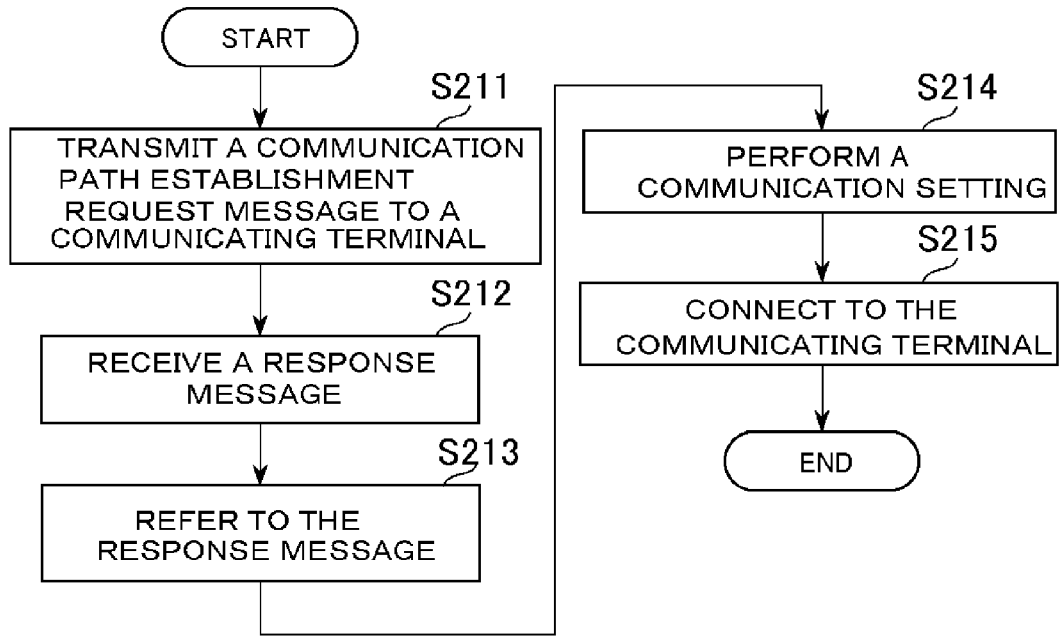

[Fig. 9]
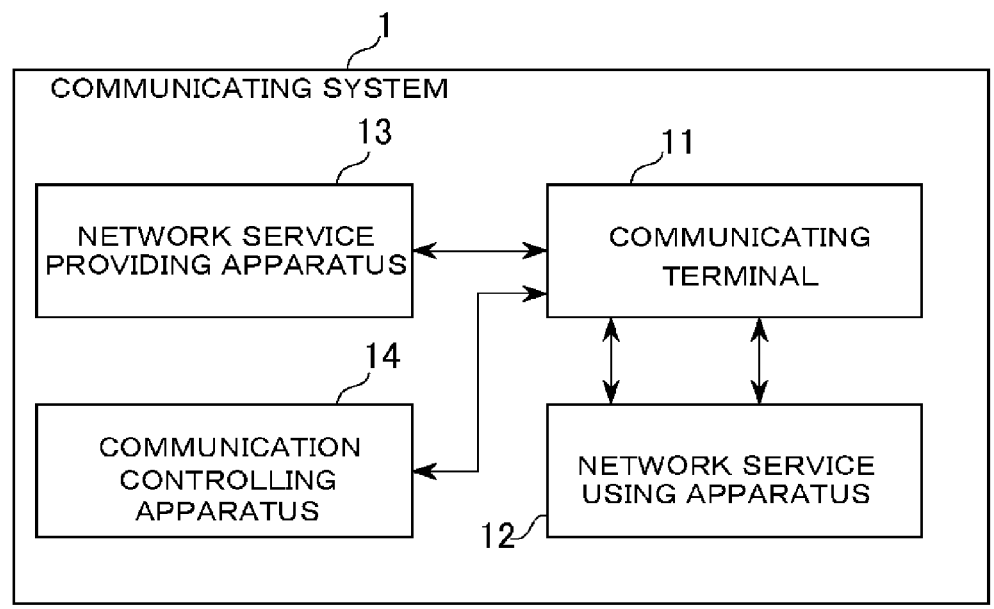
[Fig. 10]
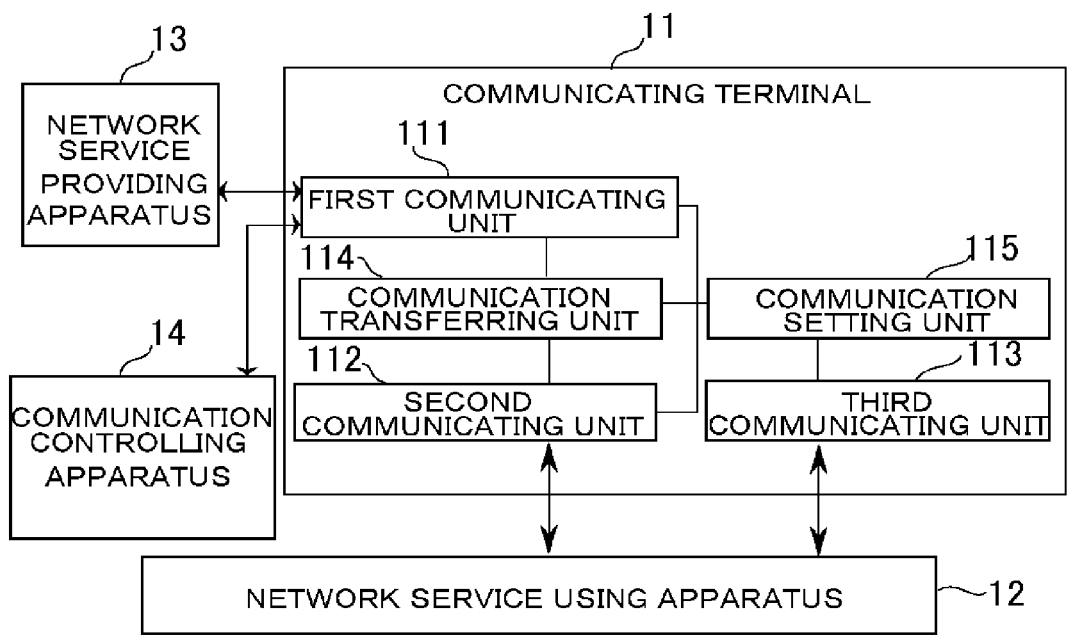

[Fig. 11]
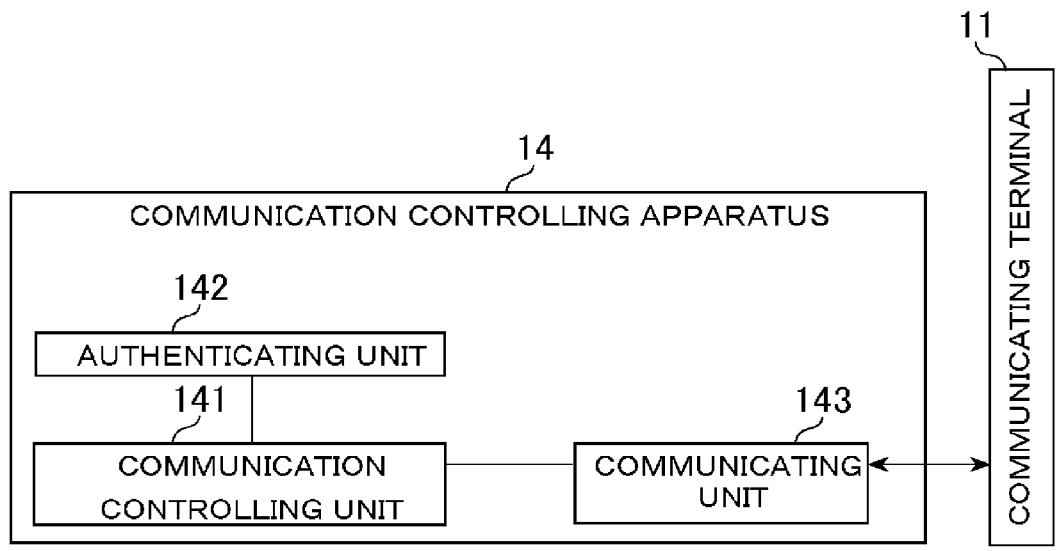
[Fig. 12]
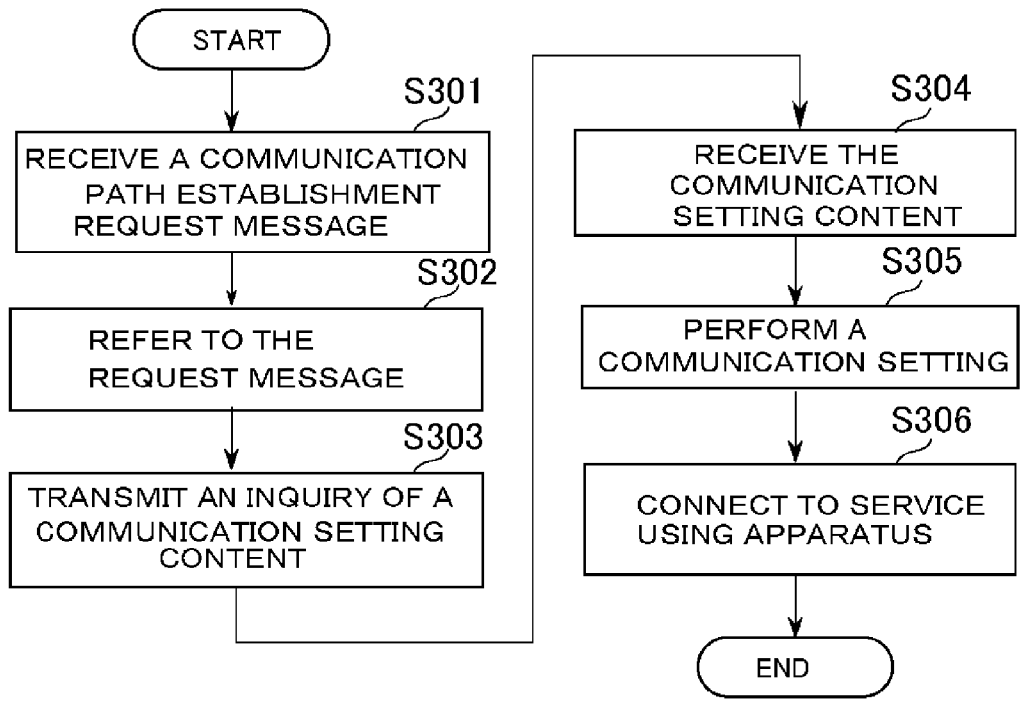

[Fig. 13]
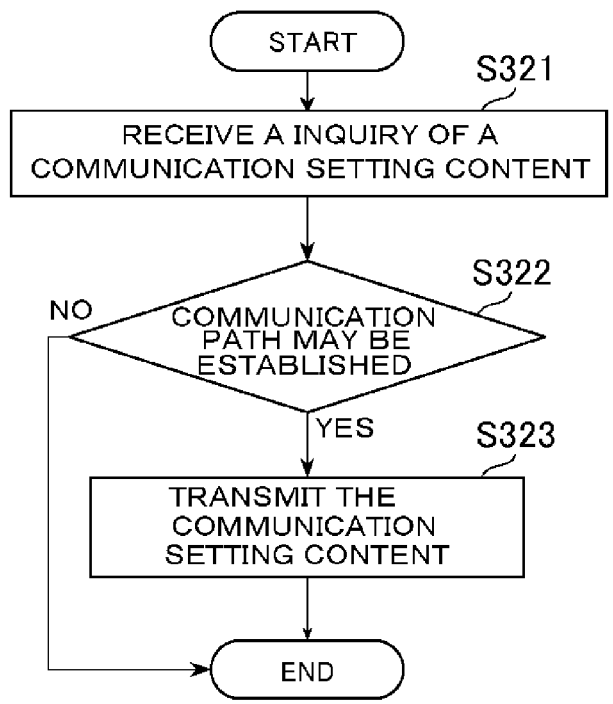
[Fig. 14]
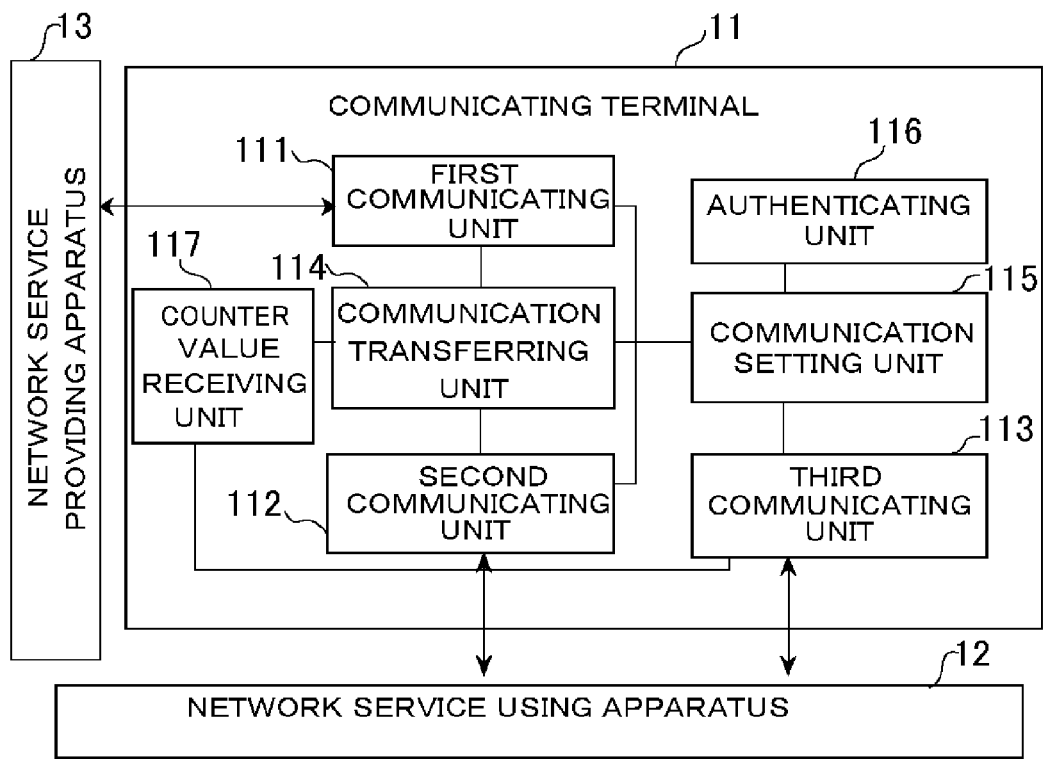

[Fig. 15]
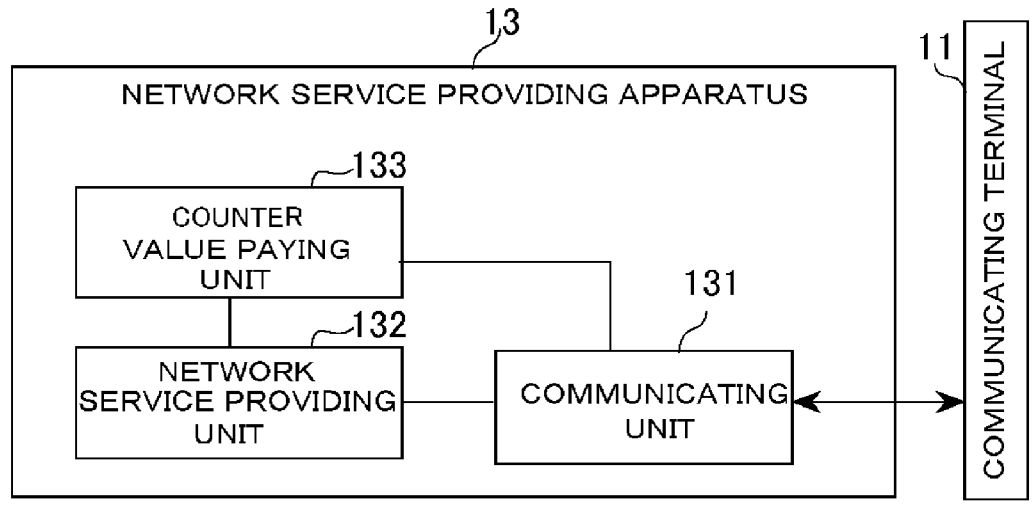
[Fig. 16]
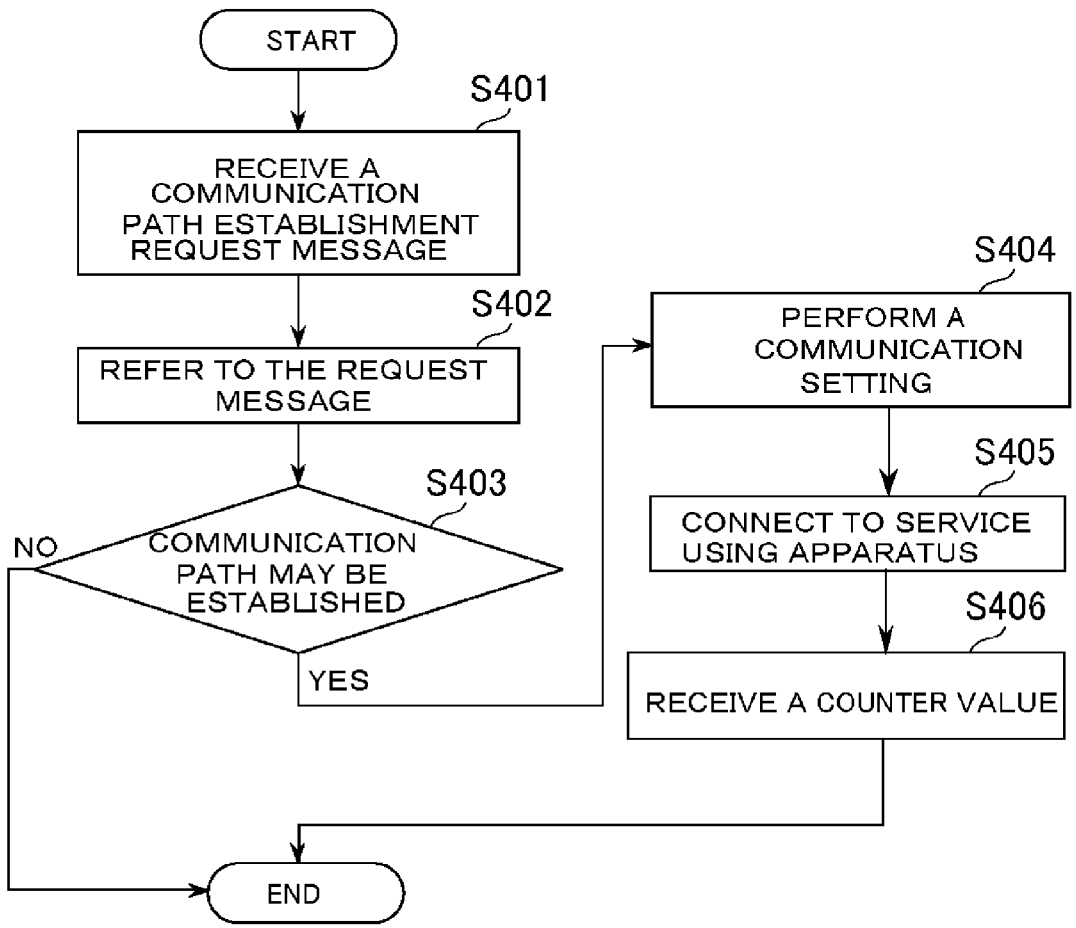

[Fig. 17]
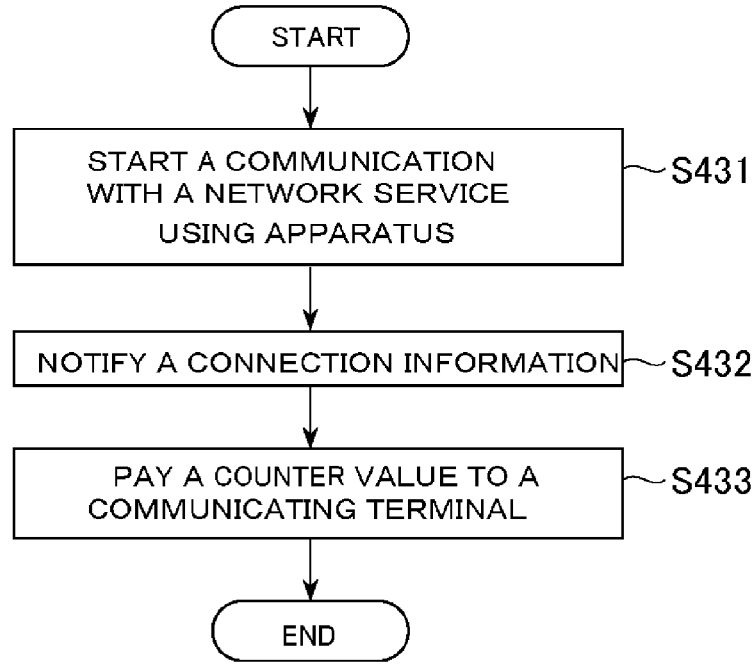
[Fig. 18]
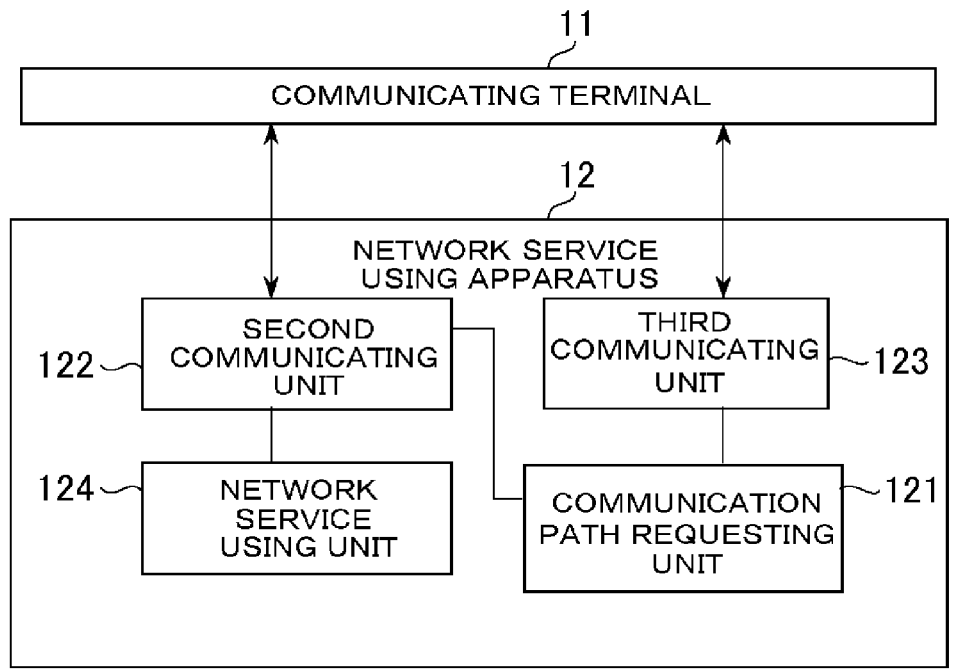

[Fig. 19]
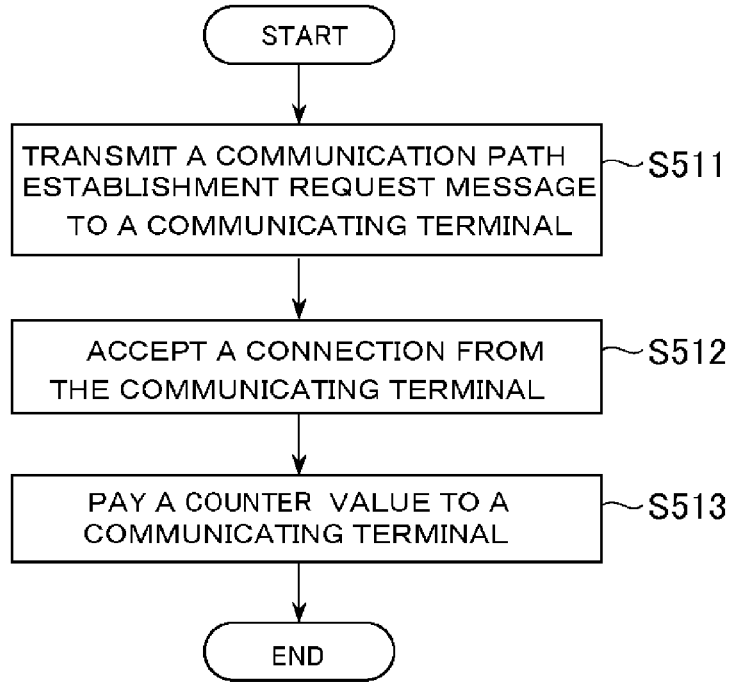
[Fig. 20]
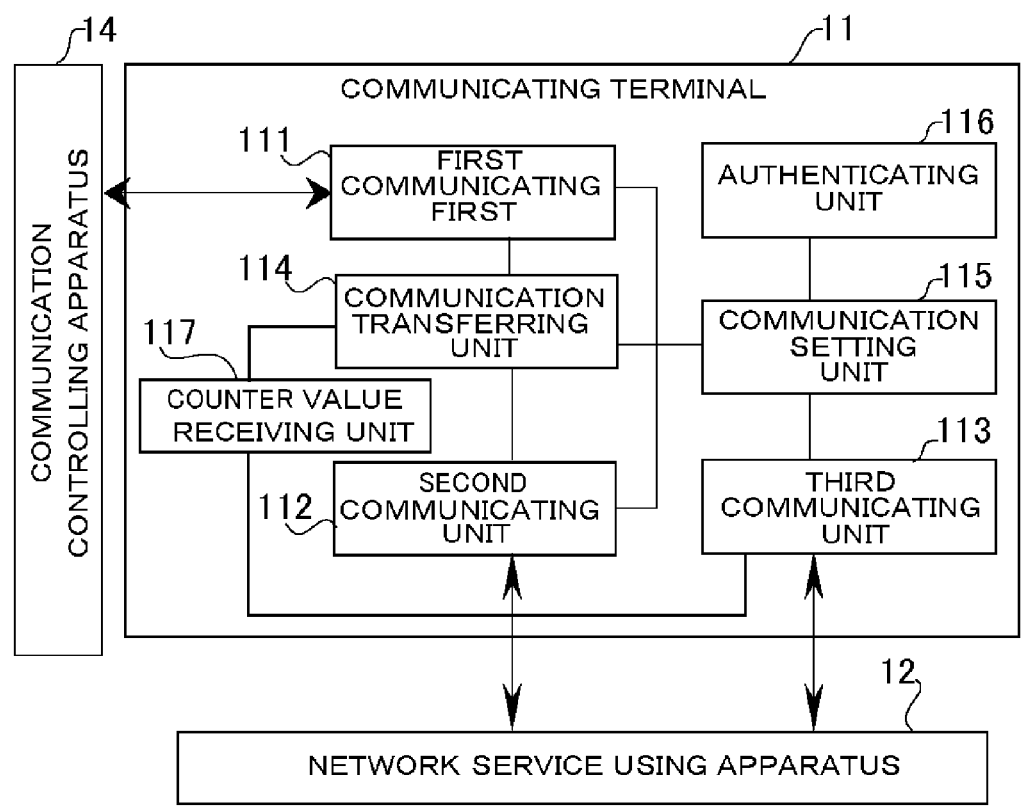

[Fig. 21]
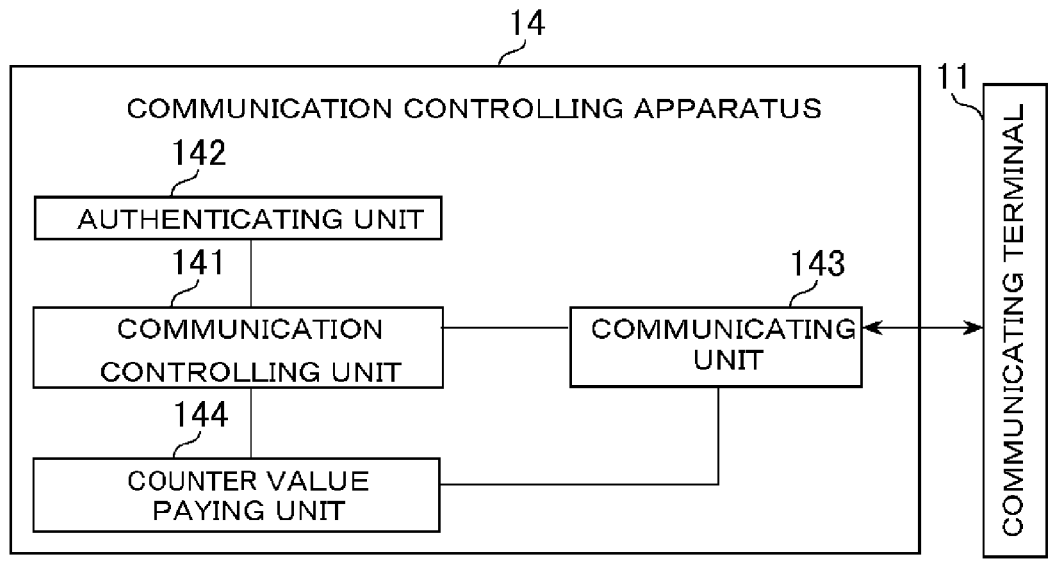
[Fig. 22]
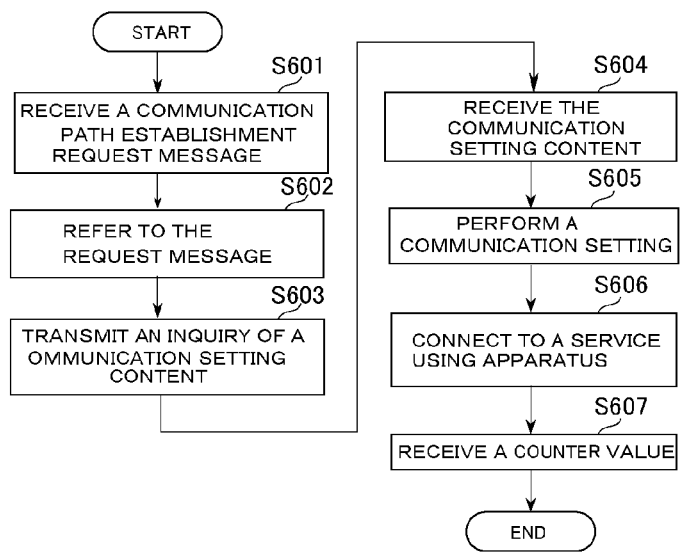

[Fig. 23]
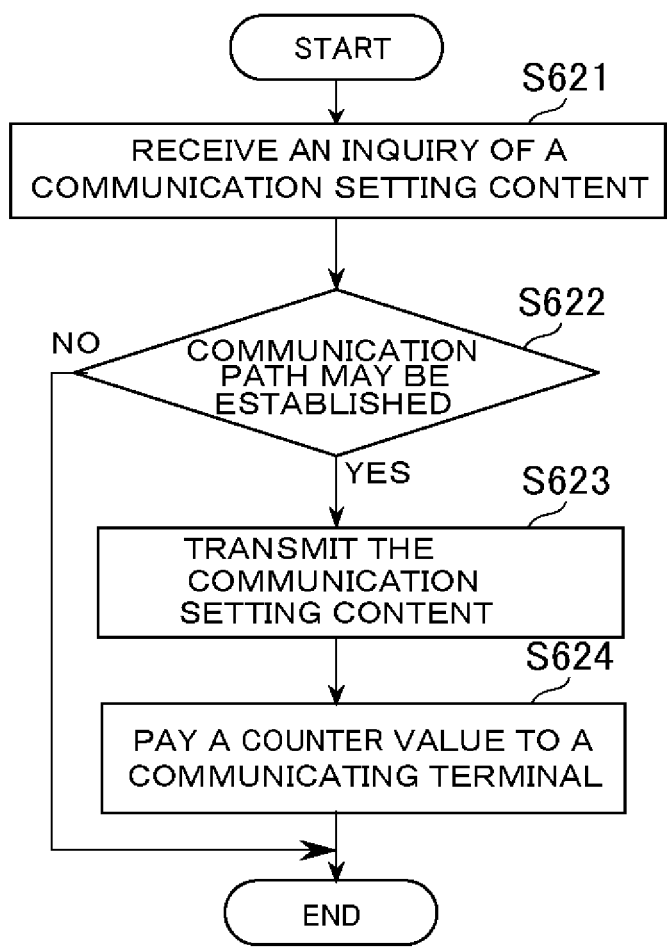

COMMUNICATING SYSTEM, COMMUNICATING TERMINAL, COMMUNICATING METHOD AND STORAGE MEDIUM

CROSS-REFERENCE TO RELATED APPLICATIONS

This application is a national stage application of International Application No. PCT/JP2013/001906 entitled "COMMUNICATING SYSTEM, COMMUNICATING TERMINAL, COMMUNICATING METHOD AND STORAGE MEDIUM" filed on Mar. 21, 2013, which claims priority to Japanese Patent Application No. 2012-068189 filed on Mar. 23, 2012, the disclosures of which are hereby incorporated by reference in their entirety.

TECHNICAL FIELD

The present invention relates to a communicating system, and more particularly relates to a communicating system that includes a network service using apparatus in which a network connection setting is not performed.

BACKGROUND ART

It is known that there is an art for remote controlling an apparatus such as an automatic vending machine through a network. JP 2011-229184A (Patent Literature 1) discloses a communicating system that provides a communication path to a network service using apparatus, by preparing a connecting apparatus in which a communication setting (a communication configuration) is performed in advance each network service using apparatus. However, in the communicating system in the patent literature 1, each network service using apparatus requires the connecting apparatus.

In order to reduce a cost required for the connecting apparatus, it is considered a method in which the network service using apparatus connects with the network through a communicating terminal held by a user of the network service using apparatus. A NEC Casio Mobile Communications, "Medias WP using guide WiFi/mobile network" (non-patent literature 1) discloses a network system in which a user of a communicating terminal (master device) performs a communication setting of the communicating terminal (master device) and consequently provides a communication path through the communicating terminal (master device), to the network service using apparatus (slave device). However, in the network system in the non-patent literature 1, the user of the communicating terminal needs to manually perform the communication setting to provide the communication path to the network service using apparatus.

CITATION LIST

Patent Literature

[Patent Literature 1] JP 2011-229184A

Non-Patent Literature

[Non-Patent Literature 1] NEC Casio Mobile Communications, "Medias WP Using Guide WiFi/Mobile Network", [online], <URL: http://www.n-keitai.com/n-06c/guide/step 15-03.html>

SUMMARY OF THE INVENTION

A subject matter of the present invention is to provide a communicating system which a communicating terminal doesn't need to manually perform the communication setting for providing the communication path to the network service using apparatus.

A communicating terminal of the present invention contains a first communicating unit, a second communicating unit, a third communicating unit and a communication setting unit. The first communicating unit communicates with a network service providing apparatus through a network. The second communicating unit communicates with a network service using apparatus. The third communicating unit receives a request message of a communication path establishment, from the network service using apparatus. The communication setting unit performs the communication settings of the first communicating unit and the second communicating unit to establish a communication path through the first communicating unit and the second communicating unit based on the request message from the third communicating unit.

A communicating system of the present invention contains the above-mentioned communicating terminal, a network service using apparatus and a network service providing apparatus. The network service using apparatus communicates with the communicating terminal. The network service providing apparatus communicates with the communicating terminal through a network.

In a communicating method, a first communicating unit communicates with the network service providing apparatus through a network. A second communicating unit communicates with the network service using apparatus. A third communicating unit receives a request message of a communication path establishment, from the network service using apparatus. A communication setting unit performs the communication settings of the first communicating unit and the second communicating unit to establish a communication path through the first communicating unit and the second communicating unit based on the request message from the third communicating unit.

A program of the present invention is a program to make a computer in the above-mentioned communicating method. It should be noted that the program of the present invention can be stored in a storage unit and a storage medium.

According to the present invention, a network service using apparatus can automatically perform a communication setting of a communicating terminal, when the network service using apparatus connects a network through the communicating terminal.

BRIEF DESCRIPTION OF DRAWINGS

FIG. 1 is a diagram showing a configuration example of a communicating system 1 in a first exemplary embodiment.

FIG. 2 is a diagram showing a configuration example of a communicating terminal 11 in the first exemplary embodiment.

FIG. 3 is a diagram showing a configuration example of a network service using apparatus 12 in the first exemplary embodiment.

FIG. 4 is a diagram showing a configuration example of a network service providing apparatus 13 in the first exemplary embodiment.

FIG. 5 is a flowchart of an operation method of the communicating terminal 11 in the communicating system 1 in the first exemplary embodiment.

FIG. 6 is a flowchart of an operation method of a network service using apparatus 12 in the communicating system 1 of the first exemplary embodiment.

FIG. 7 is a flowchart of the operation method of the communicating terminal 11 in the communicating system 1 in a second exemplary embodiment.

FIG. 8 is a flowchart of the operation method of the network service using apparatus 12 in the communicating system 1 in the second exemplary embodiment.

FIG. 9 is a diagram showing a configuration example of the communicating system 1 in a third exemplary embodiment.

FIG. 10 is a diagram showing a configuration example of the communicating terminal 11 in the communicating system 1 in the third exemplary embodiment.

FIG. 11 is a diagram showing a configuration example of a communication controlling apparatus 14 in the communicating system 1 in the third exemplary embodiment.

FIG. 12 is a flowchart showing an operation method of the communicating terminal 11 in the communicating system 1 in the third exemplary embodiment.

FIG. 13 is a flowchart showing an operation method of the communication controlling apparatus 14 in the communicating system 1 in the third exemplary embodiment.

FIG. 14 is a diagram showing a configuration example of the communicating terminal 11 in the communicating system 1 in a fourth exemplary embodiment.

FIG. 15 is a diagram showing a configuration example of a network service providing apparatus 13 in the communicating system 1 in the fourth exemplary embodiment.

FIG. 16 is a flowchart of an operation method of the communicating terminal 11 in the communicating system 1 in the fourth exemplary embodiment.

FIG. 17 is a flowchart of the operation method of the network service providing apparatus 13 in the communicating system 1 in the fourth exemplary embodiment.

FIG. 18 is a diagram showing a configuration example of the network service providing apparatus 13 in the communicating system 1 in a fifth exemplary embodiment.

FIG. 19 is a flowchart of an operation method of the network service providing apparatus 13 in the communicating system 1 in the fifth exemplary embodiment.

FIG. 20 is a diagram showing a configuration example of the communicating terminal 11 in the communicating system 1 in a sixth exemplary embodiment.

FIG. 21 is a diagram showing a configuration example of the communication controlling apparatus 14 in the communicating system 1 in the sixth exemplary embodiment.

FIG. 22 is a flowchart of an operation method of the communicating terminal 11 in the communicating system 1 in the sixth exemplary embodiment.

FIG. 23 is a flowchart of the operation method of the communication controlling apparatus 14 in the communicating system 1 in the sixth exemplary embodiment.

DESCRIPTION OF EXEMPLARY EMBODIMENT

Hereinafter, a communicating system 1 pertaining to the exemplary embodiment of the present invention will be described with reference to the attached drawings.

First Exemplary Embodiment (Explanation of Configuration)

First of all, the configuration of the communicating system 1 in the first exemplary embodiment of the present invention is described. Hereinafter, the configuration of the communicating system 1 in the first exemplary embodiment will be described by using FIGS. 1 to 4. FIG. 1 is the diagram showing the configuration example of the communicating system 1 in the first exemplary embodiment. The communicating system 1 contains a communicating terminal 11, a network service using apparatus 12 and a network service providing apparatus 13. The network service using apparatus 12 and the communicating terminal 11 are connected to each other wirelessly or through a wired line. The network service providing apparatus 13 and the communicating terminal 11 are connected through a network which is not shown. The communicating terminal 11 provides a communication path for relaying a communication between the network service using apparatus 12 and the network service providing apparatus 13, to the network service using apparatus 12.

FIG. 2 is the diagram showing the configuration example of the communicating terminal 11 in the first exemplary embodiment. The communicating terminal 11 contains a first communicating unit 111, a second communicating unit 112, a third communicating unit 113, a communication transferring unit 114, a communication setting unit 115 and an authenticating unit 116. The communication transferring unit 114 is connected to the first communicating unit 111 and the second communicating unit 112. The communication setting unit 115 is connected to the communication transferring unit 114, the first communicating unit 111, the second communicating unit 112, the third communicating unit 113 and the authenticating unit 116. The communicating terminal 11 is, for example, a portable telephone or a mobile router. It should be noted that the communicating terminal 11 is not limited to those examples.

The first communicating unit 111 communicates with the other apparatuses through a network that is not shown in FIG. 2. A communication between the first communicating unit 111 and the network may be performed wirelessly or through a wired line. The communicating terminal 11 communicates with the network service providing apparatus 13 through the network, by using the first communicating unit 111. The first communicating unit 111 uses a wireless communication interface such as 3G, or a wired communication interface such as a wired LAN.

The second communicating unit 112 communicates with the network service using apparatus 12. The second communicating unit 112 may identify the network service using apparatus 12 communicating with the communicating terminal 11 based on ID of the network service using apparatus 12. Or, the second communicating unit 112 may perform an authentication based on a password or the like, when communicating with the network service using apparatus 12. The second communicating unit 112 uses a wireless communication interface such as a wireless LAN, or a wired communication interface such as a wired LAN.

The third communicating unit 113 receives a request message (hereinafter, to be referred to as "a communication path establishment request message") to establish a communication path of using the first communicating unit 111 and the second communicating unit 112, from the network service using apparatus 12. The third communicating unit 113 may communicate with the network service using apparatus 12 without performing the authentication. The third communicating unit 113 uses a short distance wireless interface such as NFC (Near Field Communication), a wireless communication interface such as Bluetooth, and a wired communication interface such as USB.

The communication transferring unit 114 transfers an input communication packet to other functional blocks based on the communication setting of the communicating terminal 11. For example, among the packets inputted from the first communicating unit 111, the particular packet is outputted to the second communicating unit 112, and the packet other than it is transferred to the other functional block that is not shown in FIG. 2. Also, the communication transferring unit 114 may perform not only the transfer of the packet, but also, for example, the conversion of an IP address, the capsulation of the packet or the like.

The communication setting unit 115 receives the communication path establishment request message through the third communicating unit 113 from the network service using apparatus 12. The communication setting unit 115 transmits the communication path establishment request message to the authenticating unit 116. The communication setting unit 115 performs the communication settings with regard to the communications of the communication transferring unit 114, the first communicating unit 111 and the second communicating unit 112, as necessary. For example, the communication setting unit 115 performs the specification of the communication transferred by the communication transferring unit 114, and the authentication setting so that the second communicating unit 112 is connected to a second communicating unit 122 in the network service using apparatus 12 and the like. The detail of the configuration of the network service using apparatus 12 will be described later in detail.

The authenticating unit 116 performs an authentication and determines whether or not the communication path may be established between the network service using apparatus 12 and the network service providing apparatus 13. The authenticating unit 116 outputs the result of determining whether or not the communication path may be established, to the communication setting unit 115. The authenticating unit 116 uses an identifier of the network service using apparatus 12, or an identifier of a service used by the network service using apparatus 12, or the like, for performing an authentication and determining whether or not the communication path may be established.

Here, the processes of the communication path establishment request messages that are performed by the communication setting unit 115 and the authenticating unit 116 are described. At first, the communication setting unit 115 receives the communication path establishment request message through the third communicating unit 113 from the network service using apparatus 12. The communication setting unit 115 refers to the content of the communication path establishment request message and inquires the authenticating unit 116 about whether or not the communication path may be established. The authenticating unit 116 authenticates the content of the communication path establishment request message. When the authenticating unit 116 determines that the communication path is established, the communication setting unit 115 performs the communication setting with regard to the communication, on the communication transferring unit 114, the first communicating unit 111 and the second communicating unit 112, as necessary.

FIG. 3 is the diagram showing the configuration example of the network service using apparatus 12 in the first exemplary embodiment. The network service using apparatus 12 contains a communication path requesting unit 121, a second communicating unit 122, a third communicating unit 123 and a network service using unit 124. The communication path requesting unit 121 is connected to the second communicating unit 122 and the third communicating unit 123. The second communicating unit 122 faces the second communicating unit 112 of the communicating terminal 11. The third communicating unit 123 faces the third communicating unit 113 of the communicating terminal 11.

The network service using unit 124 is connected to the second communicating unit 122. The network service using apparatus 12 is, for example, a standalone apparatus. Specifically, it is an automatic vending machine, a car, a personal computer or the like. It should be noted that the network service using apparatus 12 is not limited to those examples.

The communication path requesting unit 121 transmits the communication path establishment request message to the communicating terminal 11, when the communication path for the connection to the network is required. The communication path establishment request message may include the identifier of the network service using apparatus 12, the authentication information of the second communicating unit 122 and the like.

The second communicating unit 122 accepts a connection from the communicating terminal 11 and performs a data communication with the communicating terminal 11. Any ID may be set for the second communicating unit 122 so that the communicating terminal 11 identifies the network service using apparatus 12. Also, the second communicating unit 122, when receiving the connection from the communicating terminal 11, may require the authentication based on the password and the like.

The third communicating unit 123 transmits the communication path establishment request message to establish the communication with the communicating terminal 11. The third communicating unit 123 in the network service using apparatus 12 may communicate with the communicating terminal 11 without performing the authentication.

The network service using unit 124 uses a network service provided by the network service providing apparatus 13. The network service using unit 124 uses the network service provided by the network service providing apparatus 13, through the second communicating unit 122, when the communication path through the communicating terminal 11 is established.

FIG. 4 is the diagram showing the configuration example of the network service providing apparatus 13 in the first exemplary embodiment. The network service providing apparatus 13 contains a communicating unit 131 and a network service providing unit 132. The communicating unit 131 is connected to the network service providing unit 132. The network service providing apparatus 13 is a server apparatus, a workstation or the like. The network service providing apparatus 13 is not limited to those examples. The network service providing unit 132 provides a service to one or more network service using apparatuses 12 through the communicating unit 131.

(Description of Operation Method)

Next, a communicating method in this exemplary embodiment will be described. Hereinafter, the operation method of the communicating system 1 in this exemplary embodiment will be described by using FIGS. 5 and 6.

At first, an operation when the communicating terminal 11 establishes the communication path between the network service using apparatus 12 and the network service providing apparatus 13 is described. FIG. 5 is the flowchart of the operation method of the communicating terminal 11 in the communicating system 1 in the first exemplary embodiment.

(1) Step S101

The third communicating unit 113 receives the communication path establishment request message from the third communicating unit 123 in the network service using apparatus 12.

(2) Step S102

The communication setting unit 115 refers to the content of the communication path establishment request message. The communication setting unit 115 inquires the authenticating unit 116 about whether or not the communication path may be established.

(3) Step S103

The authenticating unit 116 determines whether or not the communication path may be established. The authenticating unit 116, when determining that the communication path may not be established, stops it without performing the processing after that. When the authenticating unit 116 determines that the communication path may be established, the operational flow proceeds to the process of a step S104.

(4) Step S104

The communication setting unit 115 performs the communication setting to establish the communication path between the network service using apparatus 12 and the network service providing apparatus 13, on the communication transferring unit 114, the first communicating unit 111 and the second communicating unit 112, based on the content of the communication path establishment request message.

(5) Step S105

The second communicating unit 112 is connected to the second communicating unit 122 in the network service using apparatus 12 based on the communication setting set at the step S104.

Hereinafter, the operation method for the network service using apparatus 12 to establish the communication path for the communication with the network service providing apparatus 13 will be described. FIG. 6 is the flowchart of the operation method of the network service using apparatus 12 in the communicating system 1 in the first exemplary embodiment.

(1) Step S111

The communication path requesting unit 121 transmits the communication path establishment request message to the communication setting unit 115 in the communicating terminal 11, through the third communicating unit 123.

(2) Step S112

The second communicating unit 122 accepts a connection from the second communicating unit 112 in the communicating terminal 11.

According to the communicating system 1 in the first exemplary embodiment of the present invention, the network service using apparatus 12 transmits the communication path establishment request message to the communicating terminal 11. Consequently, in the network service using apparatus 12, the communication setting of the communication path for the connection to the network is automatically completed. Also, according to the communicating system 1 in the first exemplary embodiment, the authenticating unit 116 in the communicating terminal 11 can perform the conditioning when the communication path is established.

Second Exemplary Embodiment

Next, the communicating system 1 in the second exemplary embodiment of the present invention will be described. Since the configuration of the communicating system 1 in this exemplary embodiment is similar to that of the communicating system 1 in the first exemplary embodiment, its detailed description is omitted. The communicating system 1 in this exemplary embodiment differs from the communicating system 1 in the first exemplary embodiment in that the second communicating unit 112 in the communicating terminal 11 can accept connections from a plurality of network service using apparatuses 12 at the same time.

(Description of Operation Method)

Hereinafter, the operation method of the communicating system 1 in this exemplary embodiment will be described by using FIGS. 7 and 8.

At first, the operation when the communicating terminal 11 establishes the communication path between the network service using apparatus 12 and the network service providing apparatus 13 is described. FIG. 7 is the flowchart of the operation method of the communicating terminal 11 in the communicating system 1 in the first exemplary embodiment.

(1) Step S201

The third communicating unit 113 receives the communication path establishment request message from the third communicating unit 123 in the network service using apparatus 12.

(2) Step S202

The communication setting unit 115 refers to the content of the communication path establishment request message. The communication setting unit 115 inquires the authenticating unit 116 about whether or not the communication path may be established.

(3) Step S203

The authenticating unit 116 determines whether or not the communication path may be established. The authenticating unit 116, when determining that the communication path may not be established, stops it without performing the processing after that. When the authenticating unit 116 determines that the communication path may be established, the operational flow proceeds to the process of a step S204.

(4) Step S204

The communication setting unit 115 performs the communication setting to establish the communication path between the network service using apparatus 12 and the network service providing apparatus 13, on the communication transferring unit 114, the first communicating unit 111 and the second communicating unit 112 based on the content of the communication path establishment request message.

(5) Step S205

The communication setting unit 115 transmits a response message of the communication path establishment request message, to the network service using apparatus 12 through the third communicating unit 113. The content of the response message is an authentication result for a communication path establishment request message, a communication setting content that is required for the connection to the second communicating unit 112 and should be performed in the network service using apparatus 12, and the like. In accordance with this response message, the network service using apparatus 12 performs the communication setting to connect to the communicating terminal 11. Consequently, in the communicating system 1 in this exemplary embodiment, the communicating terminal 11 can accept connections from the plurality of network service using apparatuses 12 at the same time.

(6) Step S206

The second communicating unit 112 waits for the connection from the network service using apparatus 12 in which the communication setting based on the response message of the communication path establishment request message is completed. The second communicating unit 112 is connected to the second communicating unit 122 in the network service using apparatus 12 based on the communication setting set at the step S104.

Next, the operation method for the network service using apparatus 12 to establish the communication path for the communication with the network service providing apparatus 13 will be described. FIG. 8 is the flowchart of the operation method of the network service using apparatus 12 in the communicating system 1 in the second exemplary embodiment.

(1) Step S211

The communication path requesting unit 121 transmits the communication path establishment request message through the third communicating unit 123 to the communication setting unit 115 in the communicating terminal 11.

(2) Step S212

The third communicating unit 123 receives the response message of the communication path establishment request message from the third communicating unit 113 in the communicating terminal 11.

(3) Step S213

The communication path requesting unit 121 refers to the response message and specifies the communication setting of the second communicating unit 122 that is required to establish the communication path.

(4) Step S214

The communication path requesting unit 121 performs the communication setting specified at the step S213, for the second communicating unit 122.

(5) Step S215

The second communicating unit 122 is connected to the second communicating unit 112 in the communicating terminal 11 based on the communication setting performed at the step S214.

In the communicating system 1 in the second exemplary embodiment of the present invention, the second communicating unit 112 in the communicating terminal 11 accepts a connection from the second communicating unit 122 in the network service using apparatus 12. At this time, the communication setting after the response message reception of the communication path establishment request message is performed for each network service using apparatus 12. Thus, the communicating terminal 11 can accept connection requests at the same time.

Third Exemplary Embodiment (Description of Configuration)

Next, the communicating system 1 in the third exemplary embodiment of the present invention will be described. Hereinafter, the configuration of the communicating system 1 in the third exemplary embodiment will be described by using FIGS. 9 to 11. FIG. 9 is the diagram showing the configuration example of the communicating system 1 in the third exemplary embodiment. In the communicating system 1 in the third exemplary embodiment, the communication controlling apparatus 14 is added to the communicating system 1 in the first exemplary embodiment. The communication controlling apparatus 14 is connected to the communicating terminal 11 through a network that is not shown in FIG. 9. The communication controlling apparatus 14 determines whether or not the communication path may be established in the communicating terminal 11 and instructs the communicating terminal 11 to perform the communication setting for the establishment of the communication path. It should be noted that hereinafter, for the similar configurations to the communicating system 1 in the first exemplary embodiment, their detailed descriptions are omitted.

FIG. 10 is the diagram showing the configuration example of the communicating terminal 11 in the communicating system 1 in the third exemplary embodiment. In the communicating terminal 11 in the third exemplary embodiment, the authenticating unit 116 may not be included. The communication setting unit 115 in the third exemplary embodiment performs the establishment setting of the communication path, on the communication transferring unit 114, the first communicating unit 111 and the second communicating unit 112, in response to the instruction of the communication controlling apparatus 14. In the establishment setting of the communication path, the communication setting unit 115 firstly refers to the content of the communication path establishment request message. Next, the communication setting unit 115 transmits the content of the communication path establishment request message through the first communicating unit 111 to the communication controlling apparatus 14. Next, the communication setting unit 115 receives the communication setting instruction from the communication controlling apparatus 14. Next, the communication setting unit 115 performs the establishment setting of the communication path, on the communication transferring unit 114, the first communicating unit 111 and the second communicating unit 112 based on the instruction content.

FIG. 11 is the diagram showing the configuration example of the communication controlling apparatus 14 in the communicating system 1 in the third exemplary embodiment. The communication controlling apparatus 14 contains a communication controlling unit 141, an authenticating unit 142 and a communicating unit 143. The communication controlling unit 141 is connected to the authenticating unit 142 and the communicating unit 143. The communication controlling apparatus 14 is, for example a server apparatus or a workstation. It should be noted that the communication controlling apparatus 14 is not limited to those examples.

The communication controlling unit 141 receives the content of the communication path establishment request message through the communicating unit 143 from the communicating terminal 11 and transmits the instruction of the communication setting to the communication setting unit 115 in the communicating terminal 11. As an example of the instruction content of the communication setting, the instruction content indicated in the description of the communication setting unit 115 in the first exemplary embodiment is listed.

The authenticating unit 142 determines whether or not the communication path may be established establishment between the network service using apparatus 12 and the network service providing apparatus 13. The authenticating unit 142 uses the identifier of the communicating terminal 11, the identifier of the network service using apparatus 12, the identifier of the service used by the network service using apparatus 12, and the like, for determining whether or not the communication path may be established. For example, the authenticating unit 142 outputs the result of determining to the communication controlling unit 141 based on the identifier of the communicating terminal 11 inputted from the communication controlling unit 141 and the content of the communication path establishment request. The authenticating unit 142, when determining that the communication path is established, transmits the establishment setting of the communication path through the communicating unit 143 to the communicating terminal 11.

(Description of Operation Method)

Next, the communicating method of the present exemplary embodiment will be described. Hereinafter, the operation method of the communicating system 1 in this exemplary embodiment will be described by using FIGS. 12 and 13.

At first, the operation when the communication path is established between the network service using apparatus 12 and the network service providing apparatus 13 is described. FIG. 12 is the flowchart of the operation method of the communicating terminal 11 in the communicating system 1 in the third exemplary embodiment.

(1) Step S301

The third communicating unit 113 receives the communication path establishment request message from the third communicating unit 123 in the network service using apparatus 12.

(2) Step S302

The communication setting unit 115 refers to the content of the communication path establishment request message.

(3) Step S303

The communication setting unit 115 transmits the inquiry of the communication setting content to establish the communication path between the network service using apparatus 12 and the network service providing apparatus 13, through the first communicating unit 111 to the communication controlling apparatus 14.

(4) Step S304

The communication setting unit 115 receives the communication setting required to establish the communication path, from the communication controlling unit 141 in the communication controlling apparatus 14.

(5) Step S305

The communication setting unit 115 performs the communication setting to establish the communication path between the network service using apparatus 12 and the network service providing apparatus 13, on the communication transferring unit 114, the first communicating unit 111 and the second communicating unit 112 based on the communication setting received at the step S304.

(6) Step S306

The second communicating unit 112 is connected to the second communicating unit 122 in the network service using apparatus 12 based on the communication setting set at the step S305.

Next, the operation method for the network service using apparatus 12 to establish the communication path for the communication with the network service providing apparatus 13 will be described. FIG. 13 is the flowchart of the operation method of the communication controlling apparatus 14 in the communication system 1 in the third exemplary embodiment.

(1) Step S321

The communication controlling unit 141 receives the inquiry transmitted at the step S303, through the communicating unit 143.

(2) Step S322

The communication controlling unit 141 requests the authenticating unit 142 authentication to determine whether or not the communication path may be established. At this time, the authenticating unit 142 uses, for example, the content of the communication path establishment request message, the identifier of the communicating terminal 11, and the like, as a criteria for determining. If the authenticating unit 142 determines that the communication path may be established, the operational flow proceeds to the process of a step S323, and if the authenticating unit 142 determines that the communication path may not be established, the process is finished.

(3) Step S323

The communication controlling unit 141 transmits the response message, which includes the communication setting content to establish the communication path, through the communicating unit 143 to the communicating terminal 11.

The communicating system 1 in the third exemplary embodiment of the present invention can get the effect of the invention similar to that of the communicating system 1 in the first exemplary embodiment, by containing the communication controlling apparatus 14.

Fourth Exemplary Embodiment (Description of Configuration)

Next, the communicating system 1 in the fourth exemplary embodiment of the present invention will be described. Hereinafter, the configuration of the communicating system 1 in the fourth exemplary embodiment will be described by using FIGS. 14 and 15. It should be noted that for the portions similar to those of the communicating system 1 in the first exemplary embodiment, their descriptions are omitted.

FIG. 14 is the diagram showing the configuration example of the communicating terminal 11 in the communicating system 1 in the fourth exemplary embodiment. In the communicating system 1 in the fourth exemplary embodiment, a counter value receiving unit 117 is added to the communicating terminal 11 in the first exemplary embodiment. The counter value receiving unit 117 is connected to the third communicating unit 113 and the communication transferring unit 114. That is, the communicating system 1 in the fourth exemplary embodiment differs from the communicating system 1 in the first exemplary embodiment in that the network service providing apparatus 13 pays a counter value (a compensation) of a communication path provision. The counter value is, for example, charging information that can be electronically transmitted and received through the network. Also, for example, the network service providing apparatus 13 may pay via direct payment through a financial institution, by bank transfer (dispatches to bank account via direct deposit), or online transfer over the Internet. The first communicating unit 111 is connected to the network that is not shown in FIG. 14, similarly to the communicating terminal 11 in the first exemplary embodiment. It should be noted that when the communicating terminal 11 is connected through the first communicating unit 111 to the network that is not shown in FIG. 14, a fee charged by a managing person of the network or the like may be generated. The counter value receiving unit 117 receives the counter value caused by a fact that the communicating terminal 11 provides the communication path to relay the communication between the network service using apparatus 12 and the network service providing apparatus 13. The counter value receiving unit 117 communicates with a counter value paying unit 133 of the network service providing apparatus 13, through the communication transferring unit 114 and the first communicating unit 111 and receives the counter value of the communication path provision from the counter value paying unit 133.

FIG. 15 is the diagram showing the configuration example of the network service providing apparatus 13 in the communicating system 1 in the fourth exemplary embodiment. In the network service providing apparatus 13 in the fourth exemplary embodiment, the counter value paying unit 133 is added to the network service providing apparatus 13 in the first exemplary embodiment. The counter value paying unit 133 is connected to the network service providing unit 132 and the communicating unit 131. The network service providing unit 132 provides a service to one or more network service using apparatuses 12 through the communicating unit 131, similarly to the network service providing unit 132 in the first exemplary embodiment. Moreover, when the network service providing unit 132 is connected to the network service using apparatus 12, the network service providing unit 132 notifies connection information, which includes the information of the communicating terminal 11 providing the communication path, to the counter value paying unit 133. The counter value paying unit 133 pays the counter value of the communication path provision caused by the communicating terminal 11, through the communicating unit 131 to the communicating terminal 11.

(Description of Operation Method)

Next, the communicating method in this exemplary embodiment will be described. Hereinafter, the operation method of the communicating system 1 in this exemplary embodiment will be described by using FIGS. 16 and 17.

At first, the operation when the communicating terminal 11 establishes the communication path between the network service using apparatus 12 and the network service providing apparatus 13 is described. FIG. 16 is the flowchart of the operation method of the communicating terminal 11 in the communicating system 1 in the fourth exemplary embodiment.

About (1) Step S401 to (5) Step S405, they are similar to the operation method of the communicating terminal 11 in the communicating system 1 in the first exemplary embodiment.

(1) Step S401

The third communicating unit 113 receives the communication path establishment request message from the third communicating unit 123 in the network service using apparatus 12.

(2) Step S402

The communication setting unit 115 refers to the content of the communication path establishment request message. The communication setting unit 115 inquires the authenticating unit 116 about whether or not the communication path may be established.

(3) Step S403

The authenticating unit 116 determines whether or not the communication path may be established. The authenticating unit 116, when determining that the communication path may not be established, stops it without performing the processing after that. When the authenticating unit 116 determines that the communication path may be established, the operational flow proceeds to the process of a step S404.

(4) Step S404

The communication setting unit 115 performs the communication setting to establish the communication path between the network service using apparatus 12 and the network service providing apparatus 13, on the communication transferring unit 114, the first communicating unit 111 and the second communicating unit 112, based on the content of the communication path establishment request message.

(5) Step S405

The second communicating unit 112 is connected to the second communicating unit 122 in the network service using apparatus 12 based on the communication setting set at the step S404.

(6) Step S406

The counter value receiving unit 117 receives the counter value from any network service providing apparatus 13 in the communicating system 1, through the first communicating unit 111.

Next, the operation method for the network service providing apparatus 13 to pay the counter value to the communicating terminal 11 will be described. FIG. 17 is the flowchart of the operation method of the network service providing apparatus 13 in the communicating system 1 in the fourth exemplary embodiment.

(1) Step S431

After the establishing processes of the communication path between the network service using apparatus 12 and the network service providing apparatus 13 (Step S401 to Step S405), the network service providing unit 132 starts the communication with the network service using apparatus 12.

(2) Step S432

The network service providing unit 132 notifies the connection information, which includes the information of the communicating terminal 11 providing the communication path, to the counter value paying unit 133.

(3) Step S433

The counter value paying unit 133 pays the counter value to the counter value receiving unit 117 in the communicating terminal 11 through the communicating unit 131 based on the information notified at the step S432.

The communicating system 1 in the fourth exemplary embodiment of the present invention exhibits the effect similar to the communicating system 1 in the first exemplary embodiment. Moreover, in this exemplary embodiment, when the communication path is established, the network service providing apparatus 13 pays the counter value to the communicating terminal 11. Consequently, the communicating terminal 11 can pay the using fee of the network that is generated when the communication is relayed.

Fifth Exemplary Embodiment (Description of Configuration)

Next, the communicating system 1 in the fifth exemplary embodiment of the present invention will be described.

FIG. 18 is the diagram showing the configuration example of the network service using apparatus 12 in the communicating system 1 in the fifth exemplary embodiment. In the communicating system 1 in the fifth exemplary embodiment, a counter value paying unit 125 is added to the network service using apparatus 12. It should be noted that the communicating system 1 in this exemplary embodiment may not include the counter value paying unit 133 in the network service providing apparatus 13. This exemplary embodiment differs from the communicating system 1 in the fourth exemplary embodiment in that, although the network service providing apparatus 13 does not pay, the network service using apparatus 12 pays the counter value of the communication path provision. It should be noted that for the portions similar to those of the communicating system 1 in the fourth exemplary embodiment, their detailed descriptions are omitted.

FIG. 18 is the diagram showing the configuration example of the network service using apparatus 12 in the communicating system 1 in the fifth exemplary embodiment. In the communicating system 1 in the fifth exemplary embodiment, the counter value paying unit 125 is added to the communicating system 1 in the first exemplary embodiment. The counter value paying unit 125 is connected to the second communicating unit 122 and the third communicating unit 123. When the communication path to the network service providing apparatus 13 is established, the counter value paying unit 125 pays the counter value to the counter value receiving unit 117 in the communicating terminal 11, through the second communicating unit 122 or third communicating unit 123.

(Description of Operation Method)

Next, the operation method for the network service using apparatus 12 to pay the counter value to the communicating terminal 11 will be described. FIG. 19 is the flowchart of the operation method of the network service providing apparatus 13 in the communicating system 1 in the fifth exemplary embodiment.

(1) Step S511

The communication path requesting unit 121 transmits the communication path establishment request message through the third communicating unit 123 to the communication setting unit 115 in the communicating terminal 11.

(2) Step S512

The second communicating unit 122 accepts a connection from the second communicating unit 112 in the communicating terminal 11.

(3) Step S513

The counter value paying unit 125 pays the counter value to the counter value receiving unit 117 in the communicating terminal 11, through the second communicating unit 122 or third communicating unit 123.

The communicating system 1 in the fifth exemplary embodiment of the present invention exhibits the effect similar to the communicating system 1 in the first exemplary embodiment. Moreover, in this exemplary embodiment, when the communication path is established, the network service using apparatus 12 pays the counter value to the communicating terminal 11. Consequently, the communicating terminal 11 can pay the using fee of the network that is generated when the communication is relayed.

Sixth Exemplary Embodiment (Description of Configuration)

Next, the communicating system 1 in the sixth exemplary embodiment of the present invention will be described. The communicating system 1 in this exemplary embodiment differs from the communicating system 1 in the third exemplary embodiment in the following items. The communication controlling apparatus 14 in the communicating system 1 in this exemplary embodiment pays the counter value to the communicating terminal 11 when the communication is performed through the communicating terminal 11. It should be noted that for the portions similar to the communicating system 1 in the third exemplary embodiment, their detailed descriptions are omitted.

FIG. 20 is the diagram showing the configuration example of the communicating terminal 11 in the communicating system 1 in the sixth exemplary embodiment. In the communicating terminal 11 in this exemplary embodiment, the counter value receiving unit 117 is added as compared with the communicating system 1 in the third exemplary embodiment. The counter value receiving unit 117 is connected to the communication transferring unit 114 and the third communicating unit 113. It should be noted that the presence or absence of the authenticating unit 116 is arbitrary. Thus, in the followings, the case in the absence of the authenticating unit 116 is described as an example.

FIG. 21 is the diagram showing the configuration example of the communication controlling apparatus 14 in the communicating system 1 in the sixth exemplary embodiment. In the communication controlling apparatus 14 in this exemplary embodiment, a counter value paying unit 144 is added as compared with the communicating system 1 in the third exemplary embodiment. The counter value paying unit 144, the counter value paying unit 144 is connected to the communication controlling unit 141 and the communicating unit 143. The communication controlling unit 141 sends the instruction of the communication setting to the communicating terminal 11, similarly to the communication controlling unit 141 in the third exemplary embodiment. Moreover, the communication controlling unit 141 notifies the connection information, which includes the information of the communicating terminal 11 providing the communication path, to the counter value paying unit 144. The counter value paying unit 144 pays the using fee of the communication path through the communicating terminal 11, to the communicating terminal 11. The counter value paying unit 144, when receiving the connection information from the communication controlling unit 141, pays the counter value to the counter value receiving unit 117 in the communicating terminal 11 through the communicating unit 143.

(Description of Operation Method)

Next, the operation method for the communicating terminal 11 in this exemplary embodiment to receive the counter value from the communication controlling apparatus 14 will be described. FIG. 22 is the flowchart of the operation method of the communicating terminal 11 in the communicating system 1 in the sixth exemplary embodiment.

About (1) Step S601 to (6) Step S606, they are similar to the operation method of the communicating terminal 11 in the communicating system 1 in the third exemplary embodiment.

(1) Step S601

The third communicating unit 113 receives the communication path establishment request message from the third communicating unit 123 in the network service using apparatus 12.

(2) Step S602

The communication setting unit 115 refers to the content of the communication path establishment request message.

(3) Step S603

The communication setting unit 115 transmits the inquiry of the communication setting content to establish the communication path between the network service using apparatus 12 and the network service providing apparatus 13, through the first communicating unit 111 to the communication controlling apparatus 14.

(4) Step S604

The communication setting unit 115 receives the communication setting required to establish the communication path, from the communication controlling unit 141 in the communication controlling apparatus 14.

(5) Step S605

The communication setting unit 115 performs the communication setting to establish the communication path between the network service using apparatus 12 and the network service providing apparatus 13, on the communication transferring unit 114, the first communicating unit 111 and the second communicating unit 112 based on the communication setting received at the step S604.

(6) Step S606

The second communicating unit 112 is connected to the second communicating unit 122 in the network service using apparatus 12 based on the communication setting set at the step S605.

(7) Step S607

The counter value receiving unit 117 receives the counter value from the communication controlling apparatus 14 in the communicating system 1 through the first communicating unit 111.

Next, the operation method for the communication controlling apparatus 14 to pay the counter value to the communicating terminal 11 will be described. FIG. 23 is the flowchart of the operation method of the communication controlling apparatus 14 in the communicating system 1 in the sixth exemplary embodiment.

(1) Step S621

The communication controlling unit 141 receives an inquiry transmitted at the step S603, through the communicating unit 143.

(2) Step S622

The communication controlling unit 141 requests the authenticating unit 142 authentication to determine whether or not the communication path may be established. At this time, the authenticating unit 142 uses, for example, the content of the communication path establishment request message, the identifier of the communicating terminal 11, and the like, as the criteria for determining. If the authenticating unit 142 determines that the communication path may be established, the operational flow proceeds to the process of a step S323, and if the authenticating unit 142 determines that the communication path may not be established, the process is finished.

(3) Step S623

The communication controlling unit 141 transmits the response message, which includes the communication setting content to establish the communication path, through the communicating unit 143 to the communicating terminal 11.

The counter value paying unit 144 pays the counter value to the counter value receiving unit 117 in the communicating terminal 11, through the communicating unit 143.

The communicating system 1 in the sixth exemplary embodiment of the present invention exhibits the effect similar to the communicating system 1 in the third exemplary embodiment. Moreover, in this exemplary embodiment, when the communication path is established, the counter value is paid to the communicating terminal 11 from the communication controlling apparatus 14. Consequently, the communicating terminal 11 can pay the using fee of the network that is generated when the communication is relayed.

(Exemplification of Configuration)

The communicating terminal 11, the network service using apparatus 12, the network service providing apparatus 13 and the communication controlling apparatus 14 can be achieved by a processor operating based on a program to execute predetermined processing, a memory for storing the program and various data, and a network interface for externally communicating through a network.

The above-mentioned processor is exemplified by a CPU (Central Processing Unit), a microprocessor, a micro controller, a semiconductor integrated circuit (IC) having a similar function, and the like.

The above-mentioned memory is exemplified by a semiconductor memory device such as a RAM (Random Access Memory), a ROM (Read Only Memory), an EEPROM (Electrically Erasable and Programmable Read Only Memory) and a flash memory, an auxiliary storage device such as an HDD (Hard Disk Drive) and an SSD (Solid State Drive), a removable disk such as a DVD (Digital Versatile Disk), a storage medium such as an SD (Secure Digital) memory card.

The above-mentioned network interface includes a semiconductor integrated circuit such as a board (mother board, I/O board) supporting the network communication, a network adaptor such as a NIC (Network Interface Card), a similar expansion card, a communication device such as an antenna, a communication port such as a connector.

The above-mentioned network is exemplified by the Internet, LAN (Local Area Network), wireless LAN (Wireless LAN), WAN (Wide Area Network), Backbone, a cable television (CATV) line, a fixed telephone network, a mobile telephone network, WiMAX, 3G (Third-Generation Cell Phone), a lease line, IrDA (Infrared Data Association), Bluetooth (registered trademark), a serial communication line, a data bus and the like.

In practice, it is not limited to these examples.

As mentioned above, the exemplary embodiments of the present invention have been described by referring to the attached drawings. However, the present invention is not limited to the above-mentioned exemplary embodiments and can be properly changed by one skilled in the art, in the range without departing from the spirit and scope. For example, the communicating terminal 11 in each of the above-mentioned exemplary embodiments can be properly applied to the other communication devices and the like, and it is not limited to the communicating terminal 11.

This application is based upon and claims the benefit of priority from Japanese patent application No. 2012-068189, filed on Mar. 23, 2012, the disclosure of which is incorporated herein in its entirely by reference.

The invention claimed is:

1. A communicating terminal comprising:
   a first network interface circuit configured to communicate with a network service providing apparatus through a network;
   a second network interface circuit configured to communicate with at least one network service using apparatus;
   a third network interface circuit configured to receive a request message for establishing a communication path which passes through said first network interface circuit and said second network interface circuit and does not pass through said third network interface circuit, from said network service using apparatus; and
   a processor configured to:
   perform communication settings of said first network interface circuit and said second network interface circuit, to establish said communication path which passes through said first network interface circuit and said second network interface circuit, based on said request message.

2. The communicating terminal according to claim 1, wherein the processor is further configured to:
   determine whether or not the communication path may be established between the network service using apparatus and the network service providing apparatus based on said request message,
   wherein said processor performs the communication settings to said first network interface circuit and said second network interface circuit based on said request message, when the processor determines that the communication path is established.

3. The communicating terminal according to claim 1, wherein said processor transmits an inquiry of contents of the communication setting to establish the communication path, to said communication controlling apparatus through a network, and performs the communication settings to said first network interface circuit and said second network interface unit based on a response message from a communication controlling apparatus.

4. The communicating terminal according to claim 1, wherein the processor is further configured to receive a counter value for establishing the communication path between said network service using apparatus and said network service providing apparatus through said first network interface circuit and said second network interface circuit.

5. The communicating terminal according to claim 1, wherein said processor further transmits a response message of said request message to said network service using apparatus, said response message including the communication setting for a plurality of said network service using apparatuses to establish communication paths at the same time, and wherein said second network interface circuit establishes said communication path by awaiting a connection from said network service using apparatus.

6. The communicating terminal according to claim 1, wherein the processor is further configured to transfer an input communication packet to other functional blocks based on the communication setting performed by said processor.

7. A communicating system comprising:
a communicating terminal according to claim 1;
a network service using apparatus configured to communicate with said communicating terminal; and
a network service providing apparatus configured to communicate with said communicating terminal through a network.

8. A communicating method comprising:
communicating with a network service providing apparatus through a network by a first network interface circuit of a communication terminal;
communicating with a network service using apparatus by a second network interface circuit of the communication terminal;
by a third network interface circuit of the communication terminal, receiving a request message for establishing a communication path which passes through said first network interface circuit and said second network interface circuit and does not pass through said third network interface circuit, from said network service using apparatus; and
performing communication settings, by a processor, of said first network interface circuit and said second network interface circuit to establish said communication path which passes through said first network interface circuit and said second network interface circuit based on said request message.

9. A non-transitory computer-readable storage medium storing a program which makes a computer perform a communicating method according to claim 8.

10. The communicating terminal according to claim 2, wherein said processor transmits an inquiry of contents of the communication setting to establish the communication path, to said communication controlling apparatus through a network, and performs the communication settings to said first network interface circuit and said second network interface circuit based on a response message from a communication controlling apparatus.

\* \* \* \* \*